(12) United States Patent
Xuereb et al.

(10) Patent No.: US 10,469,661 B1
(45) Date of Patent: Nov. 5, 2019

(54) AUTOMATIC DIALER CALL PACING IN A CONTACT CENTER

(71) Applicant: Noble Systems Corporation, Atlanta, GA (US)

(72) Inventors: Jonathan P. Xuereb, Douglasville, GA (US); Mary Tabitha Lumsden, Snellville, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 16/378,708

(22) Filed: Apr. 9, 2019

(51) Int. Cl.
 *H04M 3/51* (2006.01)
 *H04M 7/00* (2006.01)
 *H04M 3/42* (2006.01)
(52) U.S. Cl.
 CPC ..... *H04M 3/5158* (2013.01); *H04M 3/42195* (2013.01); *H04M 7/006* (2013.01)
(58) Field of Classification Search
 CPC . H04M 3/5158; H04M 7/006; H04M 3/42195
 USPC .... 379/266.07, 265.02, 266.08, 242, 266.01, 379/266.03, 265.09, 265.01
 See application file for complete search history.

(56) References Cited

U.S. PATENT DOCUMENTS

| 6,282,192 B1* | 8/2001 | Murphy | H04L 12/5692 370/238 |
| 2018/0115560 A1* | 4/2018 | Green | H04L 63/083 |

* cited by examiner

*Primary Examiner* — Thjuan K Addy (57) ABSTRACT

A computer based dialer is configured to detect and respond when a call offering rate ("COR") used to originate calls is not adequately processed by a carrier expected to provide that COR service level. The dialer utilizes a pacing algorithm to generate outbound calls at an initial COR and detects when the carrier is unable to process the calls at that COR. In response, the dialer will automatically adjust the pacing algorithm to originate calls at a slower rate, and resume call originating at the slower, adjusted COR. If the conditions persists, the dialer will again reduce the pacing algorithm until the dialer determines the carrier is able to process calls at a subsequent adjusted COR. A notification alert is generated in response to detecting and adjusting the pacing algorithm, thereby notifying appropriate personal of a potential mismatch between the actual COR and expected COR over the carrier's interface.

20 Claims, 7 Drawing Sheets

AUTOMATIC DIALER CALL PACING IN A CONTACT CENTER

BACKGROUND

Contact centers may originate communications, such as voice calls, for various purposes. In the context of outbound calls, the communications handler processing the call may be, in various embodiments, a dialer, which originates voice calls. In one embodiment, the dialer may originate calls in anticipation of the call being answered, wherein the call is then connected to an available agent. Such dialers are known as "predictive dialers" as they attempt to predict when an agent is available and when a call that is placed will be answered by a live person and needs to be connected to an available agent. This avoids the agents from being connected to calls that are not answered, calls that encounter a busy signal, or are answered by an answering machine, etc.

Many contact centers employ a large number of agents. In various embodiments, there may be hundreds of available agents handling calls. Further, it is commonly the case that the predictive dialer will have to originate several calls before one call is answered by a live person and needs to be connected to an available agent. Thus, the predictive dialer may be originating a number of calls in rapid succession. These calls are received by a communication carrier, and processed to their indicated destination.

The contact center and the communications carrier will negotiate for a level of service related to processing calls as offered by the contact center. Typically, these agreements will stipulate service levels or metrics, such as a maximum number of calls that may be accepted or active at a given time. Such agreements are known as "service level agreements" or "SLAs." The "Call Offering Rate" ("COR") may be the service metric that defines the maximum rate of call offering. Other metrics may limit the number of active/pending calls. This allows the contact center to contract for a service level commensurate with its needs. By way of illustration only, an outbound contact center with a maximum of 100 agents may contract to with a carrier to allow three times ("3×") the number of agents in call originations, leading to a maximum possible of 300 pending calls. Thus, it can be expected that the dialer equipment will be configured to originate and handle no more than 300 pending calls at any given time and likewise, the carrier will be expected to process up to 300 calls simultaneously. Obviously, if the dialer originated more than 300 pending calls at any given time, the carrier would likely not act upon the excess calls.

Further, the carrier may further limit the maximum number of calls that can be established with a time period. For example, the carrier may limit the total to 300 calls, but further limit the dialer to no more than 100 calls originating per second. Because the carrier is providing a service for a fee, providing a service level greater than what is contracted essentially means providing additional services for free. The dialer, if properly configured, would not cause such an over-dial situation to occur. Thus, if the carrier did not accept all such calls, or the rate at which calls are being offered by the dialer, the dialer should report the carrier's failure to process the additional calls as an error or breach of the SLA. It should be noted that the "over-dial" condition, by itself, does not necessarily mean that that the error lies with the carrier or the dialer. An over-dial condition can occur either if the dialer is configured to dial calls at a faster rate than the carrier has agreed to accept or if the carrier is unable to accept the rate of calls which it agreed to accept. In either situation, there is a mismatch in service expectations.

If the carrier is expected to process up to a certain number of calls within a time period (i.e., a particular COR), then the dialer should be able to detect and report if that service level is not met by the carrier. If the SLA is contracted to meet a particular service level, and the carrier is not meeting that level, then the contact center may be paying a premium for services that are, in fact, not being provided. As can be expected, the contact center operator does not want to pay for carrier services not received and conversely the carrier does not want to provide services that are not being paid for.

However, many existing dialer systems may not detect, let alone report, when a carrier is not processing calls at an expected service level. Furthermore, adapting to such a situation in a contact center frequently requires manual intervention. For example, an administrator could adjust parameters in the dialer to define a new limit on the maximum number of calls, or the maximum call offering rate. Such manual intervention may require suspending call processing, which can have adverse economic effects since the agents may be idled and unable to handle calls during this time. However, without adapting the dialer to a degradation in service level, then the dialer may attempt to dial numbers, and considered these as processed, but for which corresponding calls are not launched to their destination. There are other adverse impacts that can occur when the dialer originates call attempts to a telephone number, but the carrier does not process the call as expected.

Therefore, what is needed is a better method of detecting in a dialer when a carrier is not processing calls in accordance with service level expectations, and providing an automated mechanism in the dialer to detect such occurrences and adapt accordingly without manual intervention. Further, the dialer should provide suitable notification and information about such occurrences so that such issues can be addressed by supervisory personnel. These and other considerations are the focus of the technologies and concepts presented herein to address efficient management of a dialer's pacing methods in light of changes in a carrier's ability to process calls.

BRIEF SUMMARY

Technologies are generally presented herein that involve a dialer monitoring, detecting and adjusting to "over-dialing" conditions, wherein a carrier service level expectation is not being met. The dialer will react to detecting such a condition by modifying the pacing algorithm so that the dialing rate is reduced. If the over-dialing condition still persists, then the process is repeated until the situation no longer occurs. Upon adjusting the pacing algorithm, an alert notification is provided to suitable contact center personnel so that they are informed of the condition and can later conduct a suitable investigation. The alert notification may also include information allowing personnel to know which carrier is involved. In other embodiments, the dialer may detect an outage condition, where none of the calls to that carrier are being processed. In various embodiments, a carrier may respond to an over-dialing condition by returning an error code, such as a busy error code, but which code does not actually reflect that the dialed party is busy. The dialer may distinguish between such a purported busy condition and an actual busy condition based on the relative time when such an error code is received relative to the call origination.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Embodiments of the invention may be utilized in various industries, as will become apparent to those of ordinary skill in the art as they read the disclosure. However, for purposes of this disclosure, applications involving contact centers are mainly used for illustrating various embodiments of the invention.

Exemplary Contact Center Architecture

Figure 1:
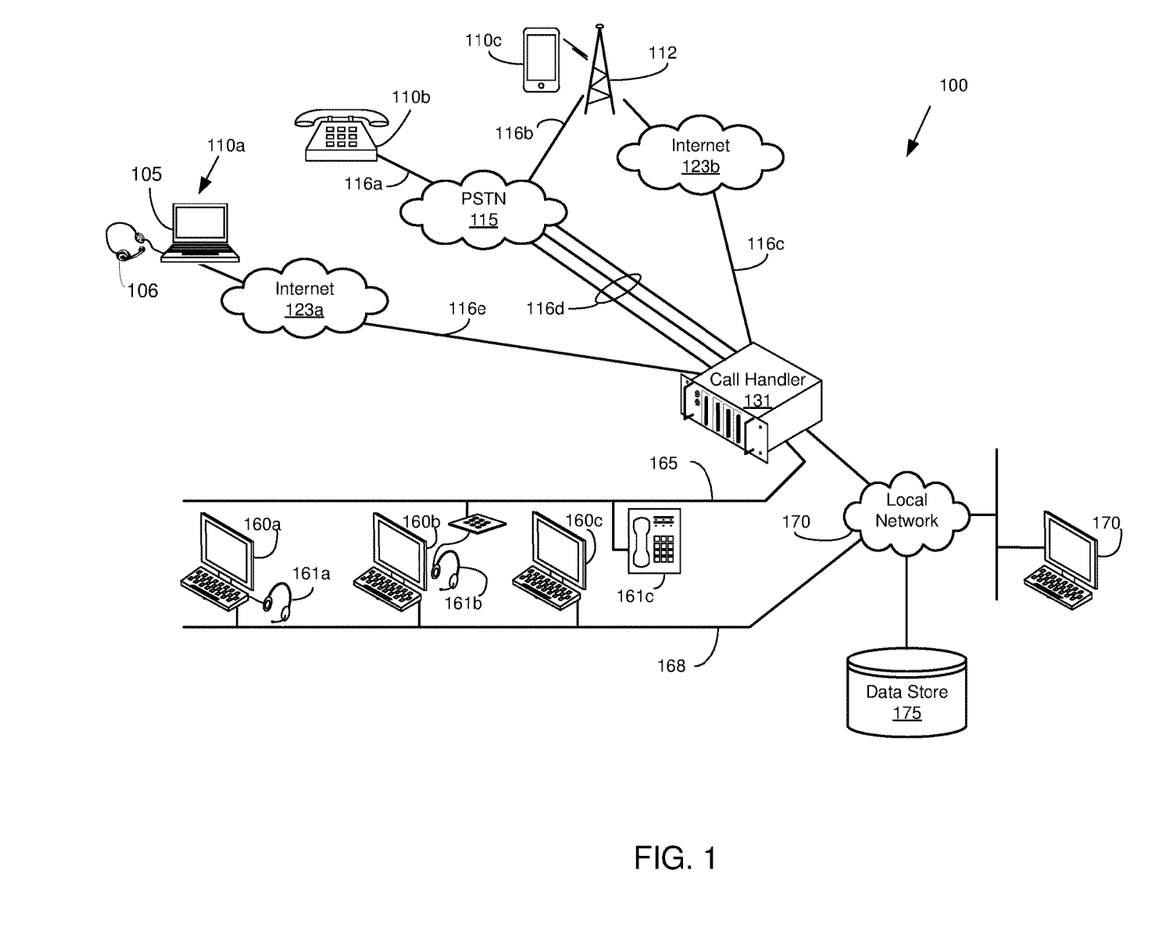
FIG. 1 shows one embodiment of a contact center architecture that may be used to practice the various concepts and technologies as disclosed herein.

FIG. 1 shows one embodiment of a contact center architecture 100 illustrating the various technologies disclosed herein. The contact center shown in FIG. 1 may process voice calls that are inbound-only, outbound-only, or a combination of both (sometimes referred to as a "blended" contact center). Thus, in some instances, the contact center may be referred to as a call center when referring primarily to the context of handling calls. Although many aspects of contact center operation are disclosed in the context of voice calls, in various embodiments, the contact center may process other forms of communication such as, for example, facsimiles, emails, text messages, video calls, and chat messages.

Since the contact center may handle calls originating from a calling party, or initiated to a called party, the term "party" or "remote party" without any further qualification, refers to a person associated with a call processed by the contact center, where the call is either received from or placed to the party. The term "caller," if used, will generally refer to a party communicating with the contact center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology. Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a headset 106. The computing device 105 may in turn be connected to an Internet 123a. Those skilled in the art will recognize that a variety of protocols and facilities may be used to convey voice calls.

In various embodiments, inbound calls from callers to the contact center may be received at communications handler, and more specifically a call handler 131, which is a computer-based processing system configured to process voice calls, such as SIP (session initiated protocol), VoIP (voice over Internet Protocol), or TDM (time division multiplexing) technology-based voice calls. In certain embodiments, the call handler could be, e.g., an automatic call distributor ("ACD") or a dialer for originating calls. In particular embodiments, the call handler 131 may be a specialized switch for receiving and routing inbound calls under various conditions. The call handler 131 may route an incoming call over contact center facilities 165 to an available agent.

Depending on the embodiment, the facilities 165 may be any suitable technology for conveying the call, including but not limited to a local area network ("LAN"), wide area network ("WAN"), ISDN, or conventional TDM circuits. In addition, the facilities 168 may be used to communicate non-voice data from the call handler 131 for presentation to the agent's workstation 160. In other embodiments, the facilities 165 and 168 may be the same.

In various embodiments, calls may be routed over facilities 165 to an agent for servicing. That is, for example, the party may speak with an agent to receive customer service. An agent typically uses a computing device 160a-160c, such as a personal computer, and a voice device 161a-161c. The combination of computing device 160a-160c and voice device 161a-161c may be referred to as a "workstation." In many instances, the computing device handles VoIP so that reference to the "computer workstation" or the "agent's computer" refers to the computer processing device of the workstation, but which may be closely integrated with handling voice as well. Thus, for these particular embodiments, the workstation can be assumed to have at least a data capability and may have a voice capability.

In various embodiments, the call handler 131 may place an incoming call in a queue if there are no suitable agents available, and/or it may route the call to an interactive voice response system ("IVR") (not shown) to play voice prompts. Depending on the embodiment, the interaction between the call handler 131, agent workstation computers 160a-160c, as well as other components, may involve using a local area network ("LAN") 170. In particular embodiments, when an agent is interacting with a called or calling party, the agent may use his computer 160a-160c to further interact with other enterprise computing systems, such as, for example, a customer relationship management ("CRM") server. The agent can also transfer the call to another agent or supervisor, if required.

In addition to receiving inbound communications, including, for example, voice calls, emails, text messages, and facsimiles, the contact center may also originate communications to a called party, referred to herein as "outbound" communications. In some embodiments, a call handler 131 may comprise a dialer, such as a predictive dialer, to originate outbound calls at a rate designed to meet various criteria. In various embodiments, the call handler 131 is typically configured to dial a list of telephone numbers to initiate outbound calls. Data for the calls may be stored in a data store 175. In many aspects, the path for the outbound call is the reverse of what is described from the inbound calls. Thus, the dialer may originate the call to various carriers, which and then routed to the called party. The dialer may also then connect that call to an available agent. Such operation is well known in the art.

Although a number of the above entities may be referred to as a "component," each may be also referred to in the art as a "computing device," "unit", "server" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication service (a so-called "communication-as-a-service" or "CaaS") to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in art will recognize FIG. 1 represents one possible configuration of a contact center architecture 100, and variations are possible with respect to the protocols, facilities, components, technologies, and equipment used.

Service Overview

With the development of VoIP and high speed fiber optics, it is possible for a dialer to generate a high number of session initiated protocol ("SIP") based messages for originating calls. Unlike TDMA or ISDN trunks, which were limited based on various timing requirements for seizing trunks for call origination, VoIP and SIP allow a high number of call establishment requests can be initiated in a very short time. Thus, it is possible for a dialer to go from having no pending call requests to several hundred requests (or more) in less than a second or two. While part of the SLA limitations may be due to the speed of the optical fiber, the carrier will also typically define other constraints on the contact center operator.

The dialer in a contact center is typically configured to limit, in some manner, the number of calls originated to a carrier. One approach is to limit the maximum number of simultaneous calls that can exist on the communication facility to a carrier. Thus, a particular carrier may limit the absolute number of calls that can be pending on a given interface (even though the fiber optic interface could theoretically support a greater number). Another limitation that may be imposed by carriers is the maximum number of calls that can originate during a time period, i.e., the rate of calls being offering, which can be measured in call per second (cps), the call offering rate ("COR"). For example, a carrier could limit the maximum number of calls to 1000 at any given time, but may further limit the maximum number of calls that could be processed within a second. Thus, if the carrier is presently servicing no calls, it may not be feasible for the carrier to accept and process 1000 calls in one-half of a second, which would be a rate of 2000 cps. There may be other limitations in the rate at which calls may be offered. These limitations are typically define in the service level agreement, which is a contractual document defining the level of services contracted by the parties.

The processing required by the receiving switch (or other device, such as an IP multimedia core network subsystem or "IMS") of the carrier receiving the call is typically more complex than the processing occurring in the dialer to originate the call. The IMS must ensure the call setup request does not violate any terms of service, determine how the call is to be routed, check available resources, etc. Because the IMS may be receiving calls from other originators simultaneously, there is the possibly that common resources may be temporarily required to service these other calls. Thus, from the carrier's perspective, calls from one customer can adversely impact the resources that can or should be provided to another customer, on a temporary basis. Those skilled in the art will realize that there are a variety of reasons why an IMS may not be able to process all the call requests as fast as it could during other times. Hence, the carrier may impose such terms of service to avoid such resource sharing constraints.

Thus, the contact center and the carrier will typically negotiate the maximum number of calls that will be handled at a given moment and which can originate during a time period. The contact center can then configure the dialer, and expect that that carrier will handle up to the maximum number of calls and call offering rate. Further, the carrier can then engineer their network resources to handle the expected service level. Typically, a carrier will ensure that the maximum number of calls will not be exceeded, since doing so in effect is offering services or a service level that the contact center has not contracted for. Thus, to the extent there is a deviation from the maximum number of calls expected or call offering rate, the carrier will typically handle less, not more, than the maximum number of calls. If the rate is exceeded, then the carrier will receive the call request, but will not complete the call to the called party.

A carrier receiving a call origination attempt, but which is not completed by the carrier (i.e., routed to its destination), is problematic for the call originator. By originating a call attempt to a number, the dialer will have recorded a call attempt, and various regulations or policies may limit the number of call attempts that can be made during a time period. In various applications, a call originator may be limited in the number of call attempts that can be made during a day or a week. Originating a call to a telephone number that the carrier, in turn, does not complete would likely still be considered a call attempt. Hence, failed call originations consumes an attempt which could have been used later.

A carrier receiving a call request and which is unable to process the call further, may respond to the call originator with an error or cause code. The exact value of the error code may depend on the carrier. For purposes of illustration, and not limitation, the SIP cause code returned may be of the value "403 Forbidden", "600 Busy Everywhere", or some other value. Appendix A to this specification illustrates some of the common error codes that might be used when processing a voice SIP call. The particular value used in a given circumstance may vary from carrier to carrier. However, the concepts and technologies herein can be used in conjunction with different error codes. The error code returned typically may be used to reflect more than one error condition that may occur that prevents the call from completing. For example, the 600 Busy Everywhere code may be returned by the terminating IMS if the far end is actually busy, and the same error code may be returned by the originating IMS if the call cannot be processed for other reasons. The call originator would like to be able to distinguish between these two situations, but doing so is difficult if the same error code is returned by the carrier for these two different situations.

What is distinct in these situations is the timing of when the error code is received by the dialer. When the IMS receiving the call from the dialer originates an error code, it will be received sooner by the dialer after the call is launched than if the same error code is originated by the terminating IMS or a switch in the terminating carrier. Typically, when the error code is received by the dialer from the serving IMS due to an over dialing condition, the error code will be received within 500 milliseconds ("ms") after the dialer originates the call, typically between sometime within 350 ms and 750 ms. On the other hand, if the terminating carrier or terminating switch returns the error code, it may be expected by the dialer between 1500-2000 ms after the call is originated, or as soon as after 1200 ms. Thus, the relative timing of when the error code is received by the dialer after the call is originated provides information to the dialer as to the source of the error code.

Thus, the dialer can maintain timestamps of when calls are launched and determine the duration until an error code is received (if at all). This allows the dialer to ascertain whether the serving IMS is returning the error code. Typically, in an over-dialing condition, a large number of calls are being offered, and more than one call originations (but not all) will result in an error code response received from the carrier at the dialer. A threshold level can be set, either by an absolute number of calls or a percentage of calls, and/or for a given time period, which when exceeded, triggers the reporting of an over-dialing condition by the dialer. Thus, typically, a single call which results in an error code returned by the receiving IMS is not sufficient to trigger the dialer reporting the over-dialing condition. But, when a number of error codes are received within a time period, then it is possible to then reliably trigger the reporting of an over-dialing condition.

Another condition that the dialer can readily detect is when all calls to that carrier result in an error code. While this could be the result of an over dialing condition, it is more likely symptomatic of an outage by the carrier. In this condition, all call attempts, not just a subset within a time period, will result in an error message returned. This is particularly true if the monitoring period is longer as compared to that used for detecting an over-dialing condition. Thus, the dialer can distinguish between an over-dial condition and an outage by monitoring what percentage of calls receive an error response from a particular carrier.

When the dialer is aware that a carrier is unable to process the calls at the rate offered, or is unable to process any calls, the dialer can then react to mitigate the condition. In the over-dial situation, the dialer may reduce the call offering rate (i.e., "throttle back" the pacing). In the condition of an outage, the dialer can select another carrier. In both situations, the dialer may provide a notification to an administrator, and potentially log the results for subsequent review. In the case of an over-dial situation, the administrator may note the carrier is unable to handle the call offering rate as contracted, and may seek concessions from the carrier for being unable to meet the agreed to service level. In certain instances, the administrator may elect to change carriers. In the case of an outage, the administrator again may seek concessions from the carrier, or eliminate that carrier as a possible provider for outbound communications.

Figure 2:
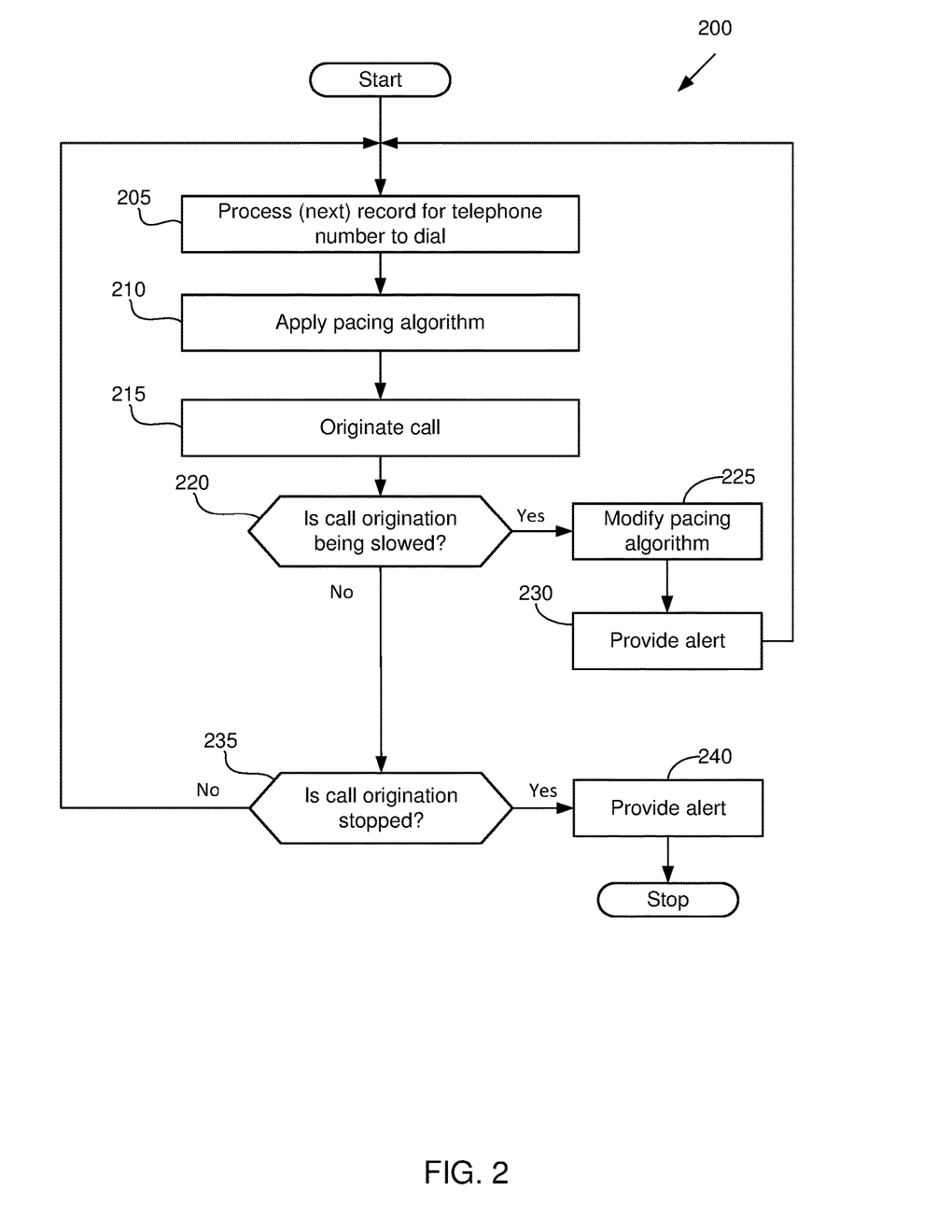
FIG. 2 illustrates one embodiment of a process flow at a high level of some of the concepts and technologies disclosed herein that involve detecting a slowdown or outage in call acceptance by a carrier.

FIG. 2—Over-Dialing Detection

One embodiment of a high level overview of this process is shown in FIG. 2. The process 200 applies when the dialer is processing calls in a given list. Starting at operation 205, the process begins with the dialer selecting a record (or a next record) to identify the telephone number to dial. After the number is identified, the dialer will then apply in operation 210 a pacing algorithm. The pacing algorithm determines when to originate the call to the previously identified number. The pacing algorithm may take into account a number of parameters, including how many active calls there are, how many agents are available and expected to be available, how many calls are pending and their status, and how many additional calls can be made. Thus, the algorithm may cause the dialer to wait in operation 210, as opposed to initiate the call immediately.

The call is then initiated in operation 215 and the dialer will determine in operation 220 whether there is a slowdown in handling the call origination rate. Or, stated another way, the dialer determines if there is there an over-dialing condition. If so, then the process proceeds to operation 225 where the dialer will modify the pacing algorithm as appropriate. The dialer will then provide an alert in operation 230, and return to process the next telephone number in the next record to be dialed in operation 205.

If there is no over-dialing in operation 220, then the process proceeds to operation 235 that determines whether call origination has stopped. Or, stated another way, the dialer determines if there is an outage that prevents the offered calls from being originated. If not, then the process returns to process the next record in operation 205 to identify the next number to be dialed. If there is an outage in operation 235, then an alert is provided in operation 240, and the process stops. Because there is an outage, there is no basis for continuing to process records and dial telephone numbers.

Thus, at a high level, the dialer is monitoring for an over-run or over-dial condition, and if detecting it, it triggers an alert and changes the pacing algorithm. The change to the pacing algorithm will slow down, in some manner, the rate of call offering or the numbers of calls originated. It is evident that if the modification to the pacing algorithm is relatively minor (e.g., so that the over-dialing condition still exists), then the process will loop back and process further records, continue to detect the over-dialing condition, and further adjust the pacing algorithm. The process will be repeated until the pacing algorithm is adjusted sufficiently to avoid the over-dialing condition. In contrast, when an outage is detected, there is no possible pacing algorithm adjustment that can occur to mitigate the outage condition. Rather, dialing should cease to occur.

The alerts provided may be sent to several individuals. Likely, an administrator or supervisor who is familiar with pacing management, dialing operation, and the interfaces with the carrier will be notified. Typically, the agent(s) may not be notified, as they are not familiar or responsible for setting the dialer pacing algorithms or managing the interactions with the carrier. The administrator, upon being informed that a carrier has an outage or is incapable of handling the number of calls, may respond appropriately. For example, the administrator may review the number of calls or the call offering rate that the carrier contracted to service, and follow up if there was a discrepancy between the service level promised and the service level provided. If there is an outage, the administrator may cease routing any calls to that carrier until a confirmation exists that service has been restored by that carrier.

It is desirable to minimize the number of telephone numbers that have been dialed but the IMS does not continue with the call. The dialer will log the call attempt, and the result. However, for many applications, the failed call will count as an origination, and may impact the ability to call that number in the future. Many regulations and policies limit the number of call attempts that can occur to a limited number within a time period, and the regulations frequently do not discriminate between calls attempts that were not successfully handled by the carrier versus those that were. Rather, all types of call attempts are treated similarly—namely, as a call attempt. For regulations that limit the number of call attempts that can be made to a number or party during a time period, these attempts (which do not result in the call being offered to the called party) essentially delay the ability to reach the called party.

Figure 3:
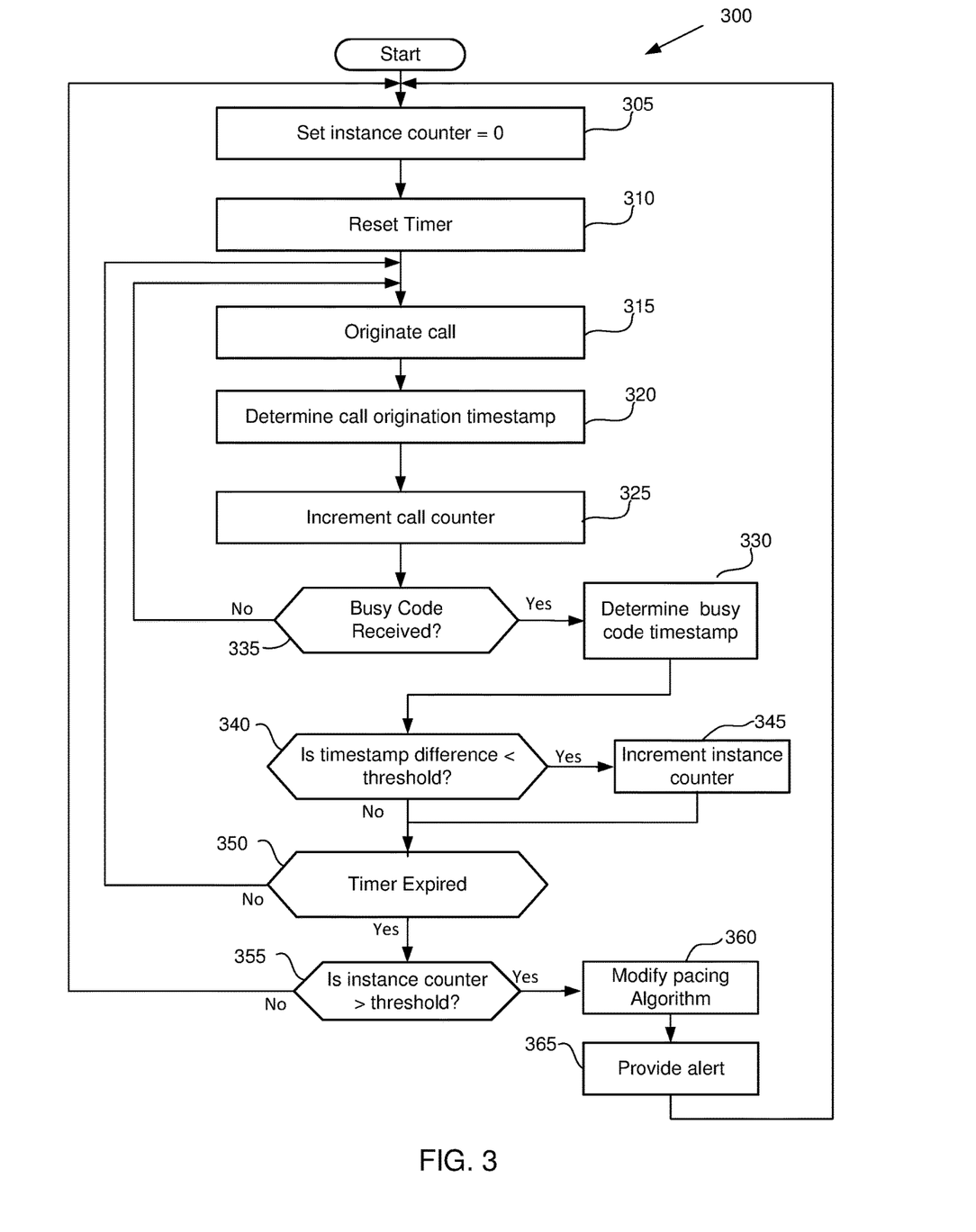
FIG. 3 illustrates one embodiment of a process flow for detecting a slowdown in processing calls by a carrier.

FIG. 3—Outage Detection

FIG. 3 illustrates one embodiment of a process flow for detecting outages by a carrier that impacts call origination by the dialer. In this process, a call counter is incremented for each call originated during a time period. A similar counter is incremented for each call that is determined to receive a busy (or other corresponding error code) indicating that the receiving IMS did not propagate the call. If these two counters are equal after a time period, then this condition indicates that all calls failed during that time period. If the time period is suitably set, then it can be reasonably deduced that an outage condition occurred, as this would impact all the calls being monitored.

To review the process in depth, the process 300 in FIG. 3 begins with resetting an instance counter in operation 305 and a timer in operation 310. This reflects that for a given time period (typically several seconds long), a counter is used to track the number of error codes received from the IMS in response to call originations.

Next, a call is originated in operation 315 and its timestamp of call origination is determined and stored in operation 320. The call counter is incremented in operation 325. If a busy code (or other error corresponding error code used by the carrier signifying that the call could not be processed) is received in operation 335, then the process ascertains a timestamp in operation 330. If the difference between the call origination timestamp and the busy code timestamp is less than a threshold (in one embodiment, this could be 500 milliseconds or up to 750 ms), then this represents the originating network responding to a call origination where it is unable to further propagate the call. The instance counter in operation 345 is incremented in response. Thus, the "instance counter" represents a count of the instances where the busy code is returned faster than the threshold, i.e., the call origination represents an instance of the initial IMS being unable to propagate the call. On the other hand, if the time difference is more than threshold, the process goes from operation 340 to operation 350. Essentially, if the difference is greater than the threshold, then an instance of the serving IMS being unable to propagate the call has not occurred and the instance counter is not incremented. Thus, the determination of the threshold value is not merely a design consideration, as there is an upper limit to setting the threshold value in order to detect that the originating switch responded with the error code. Stated otherwise, the value of the threshold is determinative to being able detect that the originating switch responded with the error code.

A test is performed in operation 350 to determine if the time period has expired. If it has not expired, then process returns to operation 315 where another call may be set up. If the time period has expired, then it is necessary to evaluate the number of instances as reflected by the instance counter in operation 355. Specifically, if the number of instances has exceeded a threshold level in operation 355, then it is determined that the call origination rate is overrunning the carrier's capabilities, and the pacing algorithm should be modified in operation 360. The threshold level could be defined as a percentage of the calls originated. For example, if 30% of the calls originated experience such treatment, then the over-dialing condition may be triggered. If triggered, then an alert is provided in operation 365. The alert may be provided to the agent, the agent's supervisor, a system administrator, and/or written to a log tracking such events. The alert informs the recipient that the dialer has been detected an over-dialing condition with the carrier. This may reflect that the dialer was configured incorrectly to originate too many calls during a time period, or more likely, that the carrier is not meeting an agreed-to service level as to the number of calls that can be handled during a time period.

If a busy code (or some other corresponding error code) is not received in operation 335 on the interface to the carrier, then the process returns to operation 315 to continue originating calls. Such calls will not cause the instance counter to increment because no error code is received, rather the response received from the carrier is consistent with the call be processed normally. Similarly, if a busy code is received, but the timing is such that it originated from a remote switch, then the instance counter is not incremented. Finally, if the timer has not expired, then there is no comparison of the instance counter with a threshold value. The comparison of the instance counter with a threshold value only occurs at the end of the time period.

The threshold value can be expressed, in one embodiment, as a percentage of the calls originating during that time period that encounter the error code response. For example, if the threshold is set to 10%, then this means that when 10% of the calls originated during the time period encounter a fake busy error code (or some other error code indicating the call did not progress as normal), then this is the point when threshold is passed and the pacing algorithm is modified and an alert generated. Normally, if the carrier's switch is able to originate the number of calls at the agreed to rate, then no calls should be encountering this type of over-dialing treatment.

The time period used to evaluate whether the over-dialing has occurred or not may be set anywhere between a short duration (e.g., several seconds) to a longer period (several hours). If the time period is set to a short time, then it is possible that the carrier may experience transient conditions that cause a small percentage of the calls to receive over dialing treatment, but which considered over a longer time period, do not represent the problem. If so, modifying the dialing algorithm may be premature. Thus, a longer time period may be used to ensure that the problem detected is determined with a high level of certainty. For example, a carrier may guarantee to process, e.g., 5 calls per second, on the average. This would translate to, e.g., 10 calls over 2 seconds. However, a dialer could offer 10 calls within 100 ms, and no calls for several seconds thereafter. In such a case, the dialer is averaging less than 5 calls per second, but exceeding that peak level within certain limited time periods. Thus, if the carrier treats certain calls as being over-dialed within those first 100 ms, adjusting the pacing algorithm and generating an alert may be premature. Thus, a longer time period (e.g., setting a threshold of e.g., 10% over several minutes or for a longer time period) will provide a more accurate result in determining whether there is a sustained issue versus a temporary anomaly. Presumably, experience will dictate that a longer time period warrants a smaller threshold difference. That is, a call center operator may determine there is a problem warranting action if the threshold of 5% is exceeded over a four hour time period, as opposed to exceeding a 10% threshold once during a 10 second period during that same four hours. Regardless of the interplay of the time period and the threshold value, the above represents a method for measuring over-dialing switch responses when originating calls by the dialer.

The modification of the pacing algorithm in operation 360 will be discussed below, and it may involve a small reduction in the rate or number of calls that can be originated within certain parameters. It is possible that a given modification of the pacing algorithm will not be sufficient to prevent an over-dial condition. If the over-dial condition persists, then the flow will progress down through operation 355 again, and modify the pacing algorithm again at operation 360. This process will repeat until the pacing algorithm is sufficiently modified to stop the over-dialing condition from occurring. Of course, the modification of the pacing algorithm can be defined to avoid repeated modifications to the algorithm. It is possible to define each modification to be significant enough so that further modifications are unlikely.

A schedule can be defined for how managing the pacing modifications are made. For example, a counter could track how many modifications have been made and determine the size of the modification. In one embodiment, the pacing algorithm is slowed by a fixed amount each time. For example, by reducing the pacing speech 10% each time (however that is defined), then for practical purposes, only 10 reductions in the pacing algorithm could be made. Other schedules can be defined where the initial modification is relatively small, and each subsequent modification is twice as great. This accelerates the modification so that the pacing algorithm is slowed down faster so that the over-dialing condition is addressed faster.

The process in FIG. 3 illustrates detecting and responding to an over-dial condition. Another condition that can be detected and responded to is an outage condition. In the outage condition, all calls attempted by the dialer during a time period to a carrier will result in error treatment. If the error is reported by the carrier returning e.g., a busy error code, then the error code will be received fairly quickly, as the originating IMS or receiving switch will be returning that error code. Further, an outage is characterized by all call attempts receiving that error code. By definition, an outage means no calls are being processed, whereas a slow down would allow some calls to be processed.

Figure 4:
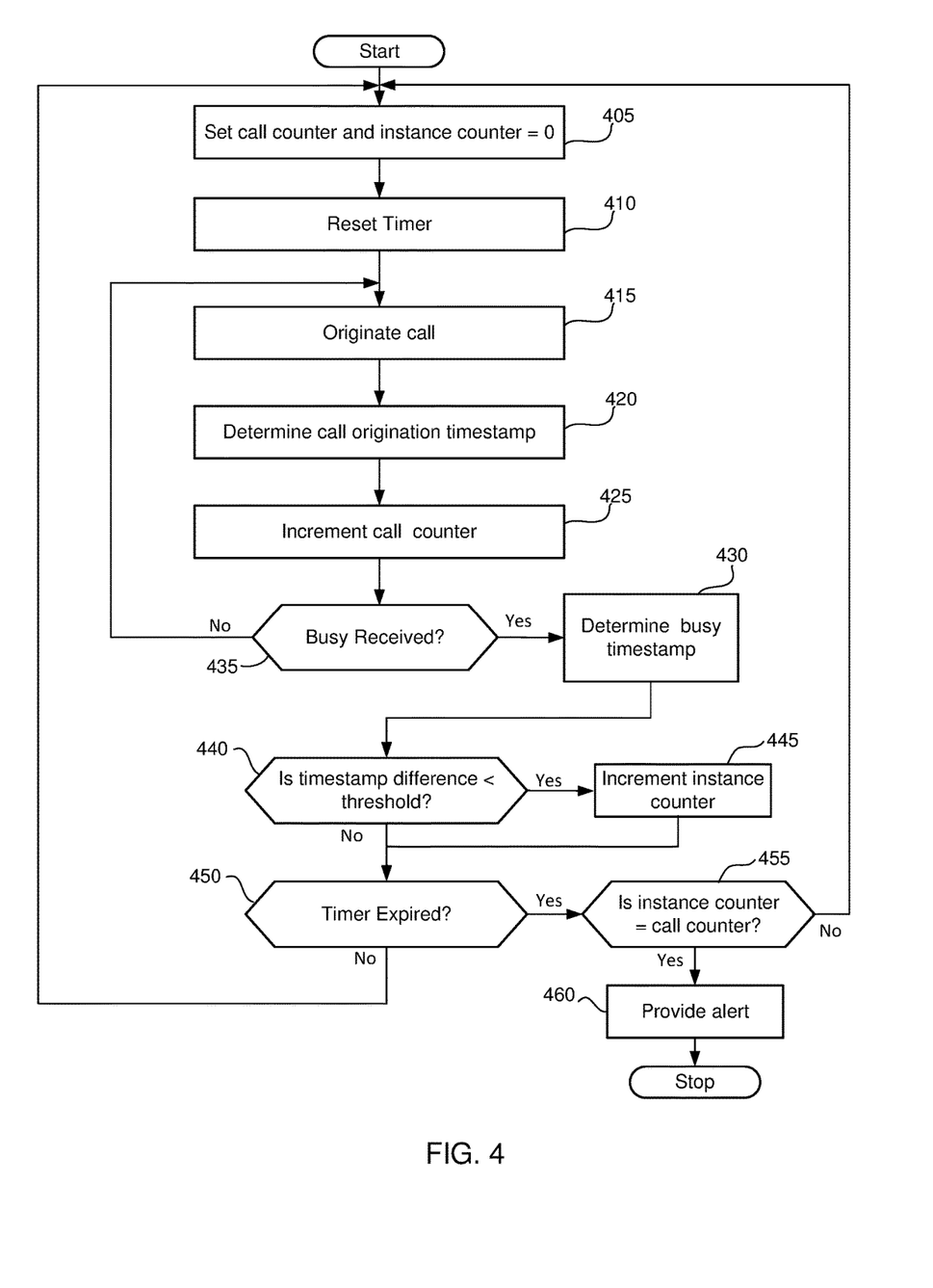
FIG. 4 illustrates one embodiment of a process flow for detecting an outage in processing calls by a carrier.

Turning to FIG. 4, the process for detecting an outage begins with setting a call counter and instance counter to zero, thereby resetting its value in operation 405. Next, a timer is reset in operation 410. This is the timer used to define an evaluation period. A call can then be originated in operation 415, by processing a call record as appropriate. A timestamp of when that call originated is determined in operation 420, and the call counter is incremented in operation 425. The call counter tracks how many calls have originated during the evaluation period.

If the carrier is not having an outage, then it is possible, and likely, that a busy error code is not received in operation 435. In this case, the signaling may indicate the call is proceeding as normal. If so, the process loops back to operation 415, where another call may be originated when the call handler so requires and as determined by the pacing algorithm. If a busy is received in operation 435, the associated timestamp is determined in operation 430. A test is made in operation 440 to determine whether the busy was received unexpectedly quickly. Specifically, if the time between the call origination and the busy code is less than a threshold in operation 440, then this indicates a potential failure, and the instance counter is incremented in operation 445. The instance counter tracks how many call originations occurred with a busy code received very quickly—e.g., symptomatic of an outage condition. The threshold value may be 500, 600, or 750 ms or less. If the busy code (or other error code as may be the case) is returned by a remote IMS, then the time difference would be greater, e.g., 1200, 1500, or up to 2000 ms.

Next a determination is made as to whether the timer associated with the time period (i.e., the evaluation period) has expired in operation 450. If so, then a test is made to determine whether the instance counter is equal to the call counter in operation 455. If there is an outage, then every call originated during the time period would have failed, i.e., an error code would have been immediately returned by the IMS to the dialer. If every call failed, then this indicates an outage condition, as opposed to an over-dial condition and the instance counter would be equal to the number of call attempts. In an over-dial condition, typically at least some calls would be originated as normal, whereas in an outage condition, none of the calls originated would have proceeded.

If the instance is equal to the call counter in operation 455, then an alert is provided in operation 460. There is no benefit from further attempting to originate calls if there is an outage. However, if the instance counter is not equal to the call counter in operation 455 (i.e., the instance counter is less than the call counter), then some of the calls have proceeded as normal (i.e., were not blocked), and it can be conclude that an outage condition does not exist. The process then loops back to operation 405 where the call counter, instance counter, and timer are all reset. The evaluation period need to run consecutively, but can occur periodically. For example, the evaluation period could run once every minute (for a few seconds) or could be initiated whenever an error code is received. This would start the evaluation period after a first call encountered an error condition, and would readily detect an outage.

Figure 5:
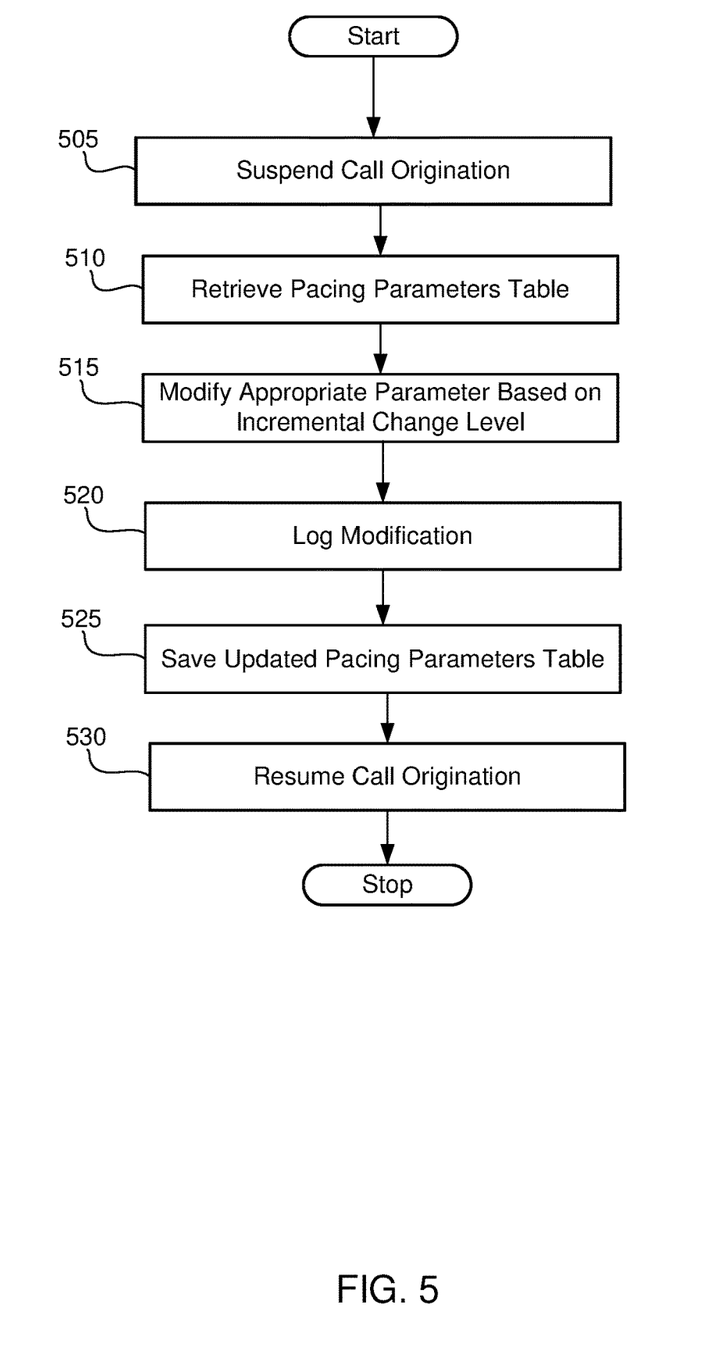
FIG. 5 illustrates one embodiment of a process flow for automatically modifying a pacing algorithm in a dialer in response to a slowdown in processing calls by the carrier.

One embodiment of a high level process for modifying the pacing algorithm is shown in FIG. 5. In FIG. 5, the process begins with the dialer suspending call origination in operation 505. The suspension, overall, may be of short duration while the pacing algorithm is being modified, but this embodiment reflects that altering the pacing of the calls typically requires first suspending call origination. Next, the pacing parameters are retrieved from memory from a table, in operation 510. The appropriate pacing parameter is then modified in operation 515.

There are various pacing parameters that may be adjusted to impact the pacing algorithm. Various pacing algorithms are known in the art, and different parameters may be defined. For example, in some embodiments the pacing algorithm may set a threshold limit of the maximum number of simultaneous pending calls (including attempted calls). If this value is reduced, then the dialer will wait until the number of simultaneous pending calls drops below this value before originating any new calls, and then only up to the allowable maximum number. In other embodiments, there is a minimum timer defined that allows a minimum time period after a first call is originated before a second call can be originated. Increasing this time, in effect, slows down the rate of call origination. In another embodiment, a rate parameter may define the maximum number of calls that can be originated during a time period. Before originating a call, the dialer may check the parameter and determine whether the call origination would cause the origination rate to be exceeded. Any of these parameters can be adjusted individual or in combination to reduce the call origination rate in the dialer. A defined step level change (i.e., a schedule for making the changes) may be defined in memory, so that each time the pacing algorithm is changed, the appropriate scope of the change occurs according to the schedule. For example, if the time period between calls is adjusted, it may default to increments of 100 ms. Thus, this would ensure that each call originating occurs 100 ms longer than the prior setting. This would mean that if this parameter were updated five times, then each call would occur at least 500 ms (5*100 ms) or ½ second after the immediately prior call. This would "slow down" the call ordering in steps of 100 ms. If the schedule include an accelerated adjustment, the first change may be to increase the delay 100 ms, the second change increases the delay to 300 ms, the third change to 500 ms, etc.

The modification is made in operation 515, and the change is logged in operation 520. Logging the operation includes recording who made the change, i.e., if automatically, then based on what condition that was detected, what was the initial value of the pacing parameter being changed, what was the changed value of the pacing parameter, and when (i.e., time) the change was made. This allows management the ability to review changes in the log, and analyze their effectiveness, and adjust the pacing schedule changes, if necessary. If, for example, a review shows that there are numerous and clustered modifications of the algorithm in e.g., 100 ms steps within a short time as described above in a row for five times, then the parameters may be adjusted to cause the change to occur in 500 ms increments, so that only one modification (rather than five) occurs. The parameters are then saved in the updated pacing parameters table in operation 525, and the call originating can be resumed in operation 530. The process is then completed, though it may be modified again.

Figure 6:
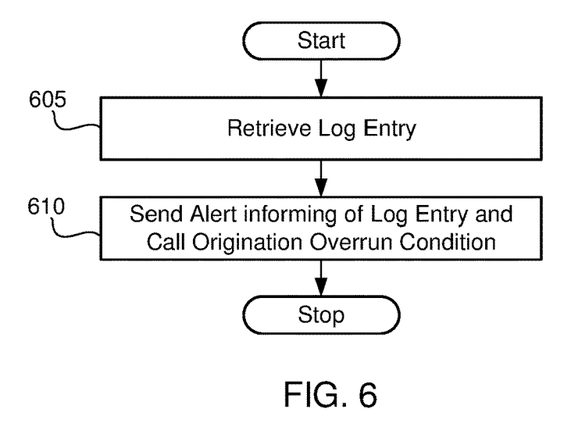
FIG. 6 illustrates one embodiment of a process flow for generating an alert.

FIG. 6 illustrates the process of generating an alert. Whenever the alert is generated, it retrieves the most recent log entry in operation 605, along with a list of the recipients that should receive the alert. The alert, including the log entry, is then sent to the list of indicated recipients. The alert is typically sent as an email and/or text message, but could be sent via an interface to a web server or URL. In various embodiments, the alert could further appear on the screen of an agent or supervisor, via a web-based icon or a push notification to a mobile application. In other embodiments, a web-based icon would allow the supervisor to retrieve the last reported alert. This may facilitate presentation of the information when the administrator or supervisor is viewing other screen-based information at their computer.

The log entry included in the alert may also provide information about the particular carrier interface which experienced the issue. A contact center may have different interfaces to a carrier for route diversity purposes, or different interfaces to different carriers. Thus, identification of the particular carrier and/or interface is useful to provide further information to the administrator to identify which carrier is involved. Further, if the carrier is not honoring their promised COR service level, then it is vital to know which carrier (if there is more than one) and/or which interface to a particular carrier, is involved.

Figure 7:
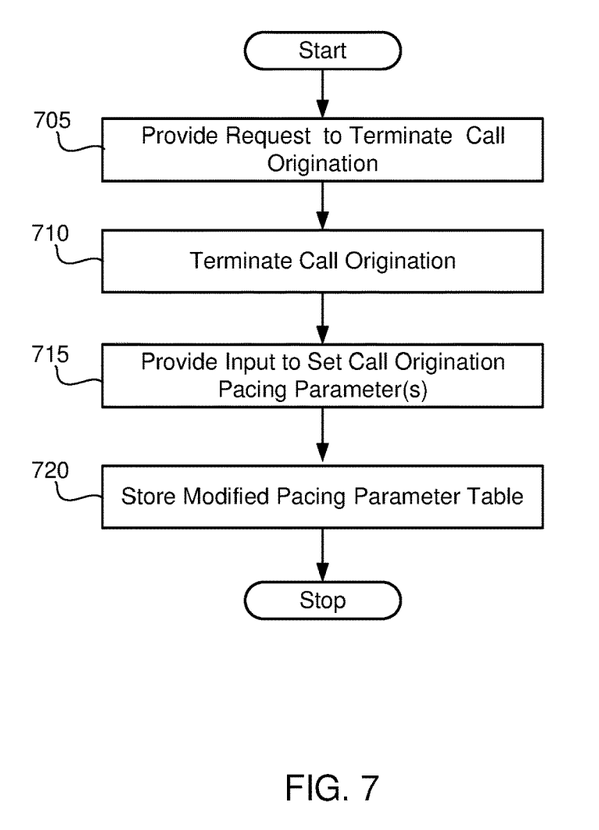
FIG. 7 illustrates one embodiment of a process flow for manually altering parameters in dialer.

FIG. 7 shows a manual modification to the pacing algorithm, which is similar in some respects to the automatic modification shown in FIG. 6. In this case, a request is made to terminate the call origination process in operation 705. This results in terminating the call origination process in the dialer at operation 710. The administrator may then modify the appropriate call origination parameter in operation 715, and the results are stored in operation memory in the pacing table parameters in operation 720. Any time thereafter, the call origination can resume. While automatic modification can occur, some dialers will not have this capability, and the administrator can achieve many of the same benefits by manually adjusting the pacing algorithm. Further, even if the administrator does not adjust the pacing algorithm, being informed via the alert of an over-dialing condition is useful, as the administrator can then address this issue with the carrier.

Exemplary Processing Device Architecture

Figure 8:
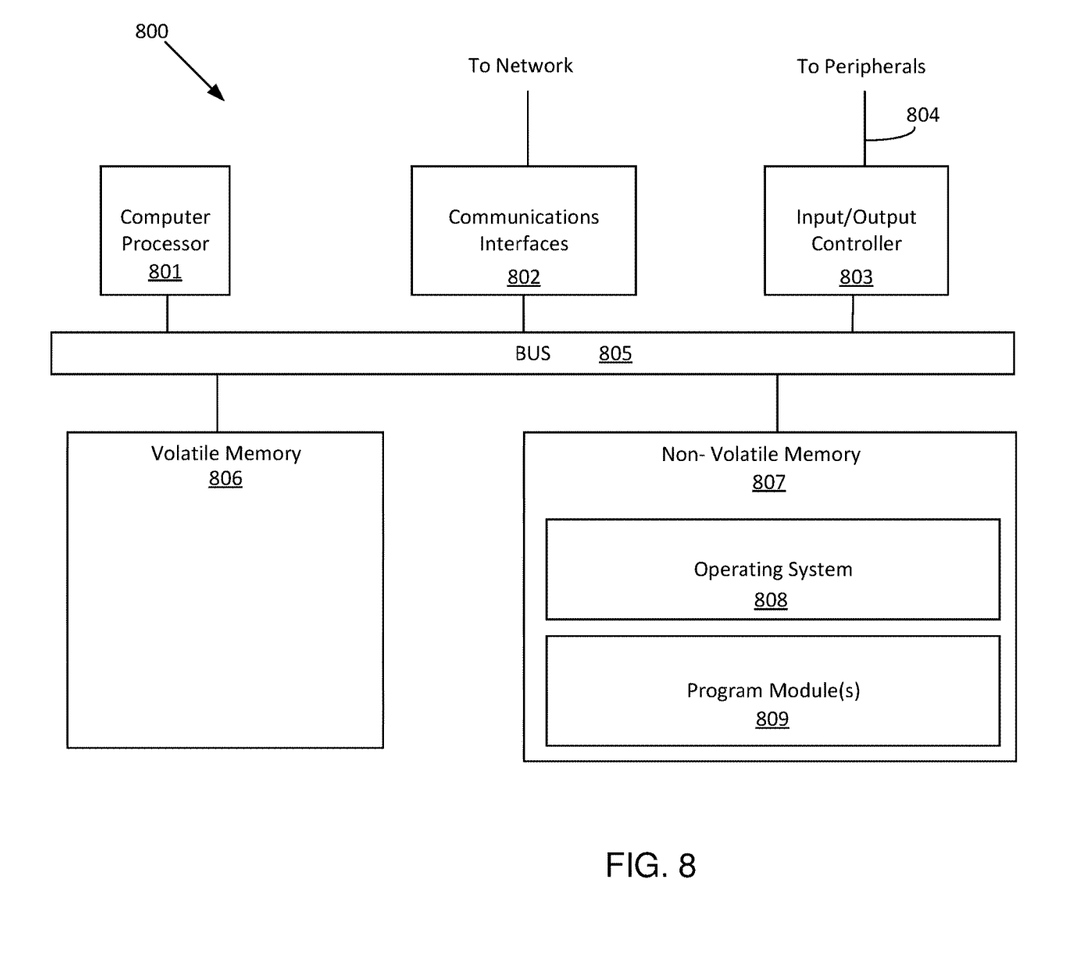
FIG. 8 illustrates one embodiment of a computer processing system for performing the concepts and technologies disclosed herein.

As discussed in conjunction with FIG. 1, the contact center architecture 100 may comprise various components. Accordingly, FIG. 8 is an exemplary schematic diagram of a computer processing component 800 that may be used in various embodiments of the component in the contact center architecture 100 to practice the technologies disclosed herein such as, for example, the communications handler 131, and specifically, e.g., a dialer. In general, the term "processing component" may be exemplified by, for example, but without limitation: a various types of computers, servers, blades, gateways, switches, and the like, as well as any combination of devices or entities adapted to perform the functions described herein.

As shown in FIG. 8, the computer processing component 800 may include one or more computer processors 801 that may communicate with other elements within the computer processing component 800 via a bus 805. The computer processor 801 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the computer processing component 800 may also include one or more communication interfaces 802 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The computer processing component 800 may further include an input/output controller 803 that may communicate with one or more input devices or peripherals using an interface 804, such as, but not limited to: a keyboard, a mouse, a touch screen/display input, microphone, pointing device, etc. The input/output controller 803 may also communicate with output devices or peripherals, such as displays, printers, speakers, headsets, banner displays, etc.

The computer processor 801 may be configured to execute instructions stored in volatile memory 806, non-volatile memory 807, or other forms of computer-readable storage media accessible to the processor 801. The volatile memory 806 may comprise various types of memory technologies, including, but not limited to: random access memory ("RAM"), dynamic random access memory ("DRAM"), static random access memory ("SRAM"), and other forms well known to those skilled in the art. The non-volatile memory 807 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 807 may store program code and data, which also may be loaded into the volatile memory 806 at execution time. Specifically, the non-volatile memory 807 may store one or more program modules 809, containing instructions for performing the processes and/or functions associated with the technologies disclosed herein, and/or operating system code 808. In addition, these program modules 809 may also access, generate, or store data 810, in the non-volatile memory 807, as well as in the volatile memory 806. The volatile memory 806 and/or non-volatile memory 807 may be used to store other information including, but not limited to: records, applications, programs, scripts, source code, object code, byte code, compiled code, interpreted code, machine code, executable instructions, or the like. These may be executed or processed by, for example, the processor 801 and/or may form a part of, or may interact with, the program modules 809.

The technologies described herein may be implemented in various ways, including as computer program products comprising memory storing instructions causing a computer processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

APPENDIX 1

Listing of Common SIP Error Codes
1xx—Provisional Responses
100 Trying
  Extended search being performed may take a significant time so a forking proxy must send a 100 Trying response.
180 Ringing
  Destination user agent received INVITE, and is alerting user of call.
181 Call is Being Forwarded
  Servers can optionally send this response to indicate a call is being forwarded.
182 Queued
  Indicates that the destination was temporarily unavailable, so the server has queued the call until the destination is available. A server may send multiple 182 responses to update progress of the queue.
183 Session Progress
  This response may be used to send extra information for a call which is still being set up.
199 Early Dialog Terminated
  Can be used by User Agent Server to indicate to upstream SIP entities (including the User Agent Client (UAC)) that an early dialog has been terminated.

2xx—Successful Responses
200 OK
Indicates the request was successful.
202 Accepted
Indicates that the request has been accepted for processing, but the processing has not been completed. Deprecated.
204 No Notification
Indicates the request was successful, but the corresponding response will not be received.
3xx—Redirection Responses
300 Multiple Choices
The address resolved to one of several options for the user or client to choose between, which are listed in the message body or the message's Contact fields.
301 Moved Permanently
The original Request-URI is no longer valid, the new address is given in the Contact header field, and the client should update any records of the original Request-URI with the new value.
302 Moved Temporarily
The client should try at the address in the Contact field. If an Expires field is present, the client may cache the result for that period of time.
305 Use Proxy
The Contact field details a proxy that must be used to access the requested destination.
380 Alternative Service
The call failed, but alternatives are detailed in the message body.
4xx—Client Failure Responses
400 Bad Request
The request could not be understood due to malformed syntax.
401 Unauthorized
The request requires user authentication. This response is issued by UASs and registrars.
402 Payment Required
Reserved for future use.
403 Forbidden
The server understood the request, but is refusing to fulfill it. Sometimes (but not always) this means the call has been rejected by the receiver.
404 Not Found
The server has definitive information that the user does not exist at the domain specified in the Request-URI. This status is also returned if the domain in the Request-URI does not match any of the domains handled by the recipient of the request.
405 Method Not Allowed
The method specified in the Request-Line is understood, but not allowed for the address identified by the Request-URI.
406 Not Acceptable
The resource identified by the request is only capable of generating response entities that have content characteristics but not acceptable according to the Accept header field sent in the request.
407 Proxy Authentication Required
The request requires user authentication. This response is issued by proxys.
408 Request Timeout
Couldn't find the user in time. The server could not produce a response within a suitable amount of time, for example, if it could not determine the location of the user in time. The client MAY repeat the request without modifications at any later time.
409 Conflict
User already registered. Deprecated by omission from later RFCs and by non-registration with the LANA.
410 Gone
The user existed once, but is not available here any more.
411 Length Required
The server will not accept the request without a valid Content-Length. Deprecated by omission from later RFCs and by non-registration with the LANA.
412 Conditional Request Failed
The given precondition has not been met.
413 Request Entity Too Large
Request body too large.
414 Request-URI Too Long
The server is refusing to service the request because the Request-URI is longer than the server is willing to interpret
415 Unsupported Media Type
Request body in a format not supported.
416 Unsupported URI Scheme
Request-URI is unknown to the server.
417 Unknown Resource-Priority
There was a resource-priority option tag, but no Resource-Priority header.
420 Bad Extension
Bad SIP Protocol Extension used, not understood by the server.
421 Extension Required
The server needs a specific extension not listed in the Supported header.
422 Session Interval Too Small
The received request contains a Session-Expires header field with a duration below the minimum timer.
423 Interval Too Brief
Expiration time of the resource is too short.
424 Bad Location Information
The request's location content was malformed or otherwise unsatisfactory.
428 Use Identity Header
The server policy requires an Identity header, and one has not been provided.
429 Provide Referrer Identity
The server did not receive a valid Referred-By token on the request.
A specific flow to a user agent has failed, although other flows may succeed. This response is intended for use between proxy devices, and should not be seen by an endpoint (and if it is seen by one, should be treated as a 400 Bad Request response).
433 Anonymity Disallowed
The request has been rejected because it was anonymous.
436 Bad Identity-Info
The request has an Identity-Info header, and the URI scheme in that header cannot be dereferenced.
437 Unsupported Certificate
The server was unable to validate a certificate for the domain that signed the request.
438 Invalid Identity Header
The server obtained a valid certificate that the request claimed was used to sign the request, but was unable to verify that signature.
439 First Hop Lacks Outbound Support
The first outbound proxy the user is attempting to register through does not support the "outbound" feature of RFC 5626, although the registrar does.

440 Max-Breadth Exceeded
  If a SIP proxy determines a response context has insufficient Incoming Max-Breadth to carry out a desired parallel fork, and the proxy is unwilling/unable to compensate by forking serially or sending a redirect, that proxy MUST return a 440 response. A client receiving a 440 response can infer that its request did not reach all possible destinations.
469 Bad Info Package
  If a SIP UA receives an INFO request associated with an Info Package that the UA has not indicated willingness to receive, the UA MUST send a 469 response, which contains a Recv-Info header field with Info Packages for which the UA is willing to receive INFO requests.
470 Consent Needed
  The source of the request did not have the permission of the recipient to make such a request.
480 Temporarily Unavailable
  Callee currently unavailable.
481 Call/Transaction Does Not Exist
  Server received a request that does not match any dialog or transaction.
482 Loop Detected
  Server has detected a loop.
483 Too Many Hops
  Max-Forwards header has reached the value '0'.
484 Address Incomplete
  Request-URI incomplete.
485 Ambiguous
  Request-URI is ambiguous.
486 Busy Here
  Callee is busy.
487 Request Terminated
  Request has terminated by bye or cancel.
488 Not Acceptable Here
  Some aspect of the session description or the Request-URI is not acceptable, or Codec issue.
489 Bad Event
  The server did not understand an event package specified in an Event header field.
491 Request Pending
  Server has some pending request from the same dialog.
493 Undecipherable
  Request contains an encrypted MIME body, which recipient cannot decrypt.
494 Security Agreement Required
  The server has received a request that requires a negotiated security mechanism, and the response contains a list of suitable security mechanisms for the requester to choose between, or a digest authentication challenge.
5xx—Server Failure Responses
500 Server Internal Error
  The server could not fulfill the request due to some unexpected condition.
501 Not Implemented
  The server does not have the ability to fulfill the request, such as because it does not recognize the request method. (Compare with 405 Method Not Allowed, where the server recognizes the method but does not allow or support it.)
502 Bad Gateway
  The server is acting as a gateway or proxy, and received an invalid response from a downstream server while attempting to fulfill the request.
503 Service Unavailable
  The server is undergoing maintenance or is temporarily overloaded and so cannot process the request. A "Retry-After" header field may specify when the client may reattempt its request.
504 Server Time-out
  The server attempted to access another server in attempting to process the request, and did not receive a prompt response.
505 Version Not Supported
  The SIP protocol version in the request is not supported by the server.
513 Message Too Large
  The request message length is longer than the server can process.
580 Precondition Failure
  The server is unable or unwilling to meet some constraints specified in the offer.
6xx—Global Failure Responses
600 Busy Everywhere
  All possible destinations are busy. Unlike the 486 response, this response indicates the destination knows there are no alternative destinations (such as a voice-mail server) able to accept the call.
603 Decline
  The destination does not wish to participate in the call, or cannot do so, and additionally the destination knows there are no alternative destinations (such as a voice-mail server) willing to accept the call.
604 Does Not Exist Anywhere
  The server has authoritative information that the requested user does not exist anywhere.
606 Not Acceptable
  The user's agent was contacted successfully but some aspects of the session description such as the requested media, bandwidth, or addressing style were not acceptable.
607 Unwanted
  The called party did not want this call from the calling party. Future attempts from the calling party are likely to be similarly rejected.

The invention claimed is:

1. A dialer comprising a computer processor configured to:
  originate a first voice telephone call over an interface comprising an integrated services digital network ("ISDN") interface or a SIP-based VoIP interface of a telecommunications carrier;
  record a first timestamp of a call origination time associated with the first voice telephone call origination to the telecommunications carrier;
  increment a call counter in response to originating the first voice telephone call;
  determine a second timestamp associated with receipt of an error code over the interface from the telecommunications carrier reflecting that the first voice telephone call was not offered to the called party;
  determine that a time difference between the second timestamp and the first timestamp is less than a threshold level, wherein the threshold level is no greater than 500 milliseconds;
  in response to determining the time difference is less than the threshold level, modify a pacing algorithm used to originate the first voice telephone call over the interface thereby producing a modified pacing algorithm, wherein the modified pacing algorithm is used to originate a second voice telephone call over the interface; and originate the second voice telephone call over the interface using the modified pacing algorithm.

2. The dialer comprising the computer processor of claim 1, wherein the computer processor is configured to:
modify the pacing algorithm so that the second voice telephone call is originated at a slower rate relative to prior voice calls originated over the interface before the first voice telephone call.

3. The dialer comprising the computer processor of claim 1, wherein the computer processor is configured to:
record in a log stored in a memory accessed by the computer processor a third timestamp indicating when the pacing algorithm was modified.

4. The dialer comprising the computer processor of claim 3, wherein the computer processor is configured to:
generate an alert to an administrator in response to modifying the pacing algorithm, wherein the alert comprises one from the group of a text and an email.

5. The dialer of claim 4, wherein the alert includes an indication of a pacing parameter value in the pacing algorithm that is modified.

6. The dialer comprising the computer processor of claim 1, wherein the computer processor is configured to:
include in the alert an indication of an outage associated with the interface of the telecommunications carrier.

7. The dialer of claim 4, wherein the computer processor is configured to:
receive an error code comprising a "486 busy" code on the interface from the telecommunications carrier comprising the SIP-based VoIP.

8. A non-transitory computer readable medium comprising instructions that when executed by a computer processor cause the computer processor to:
originate a first voice telephone call over an interface comprising an integrated services digital network ("ISDN") interface or a SIP-based VoIP interface of a telecommunications carrier;
record a first timestamp of a call origination time associated with the first voice telephone call origination to the telecommunications carrier;
increment a call counter in response to originating the first voice telephone call;
determine a second timestamp associated with receipt of an error code over the interface from the telecommunications carrier reflecting that the first voice telephone call was not offered to the called party;
determine that a time difference between the second timestamp and the first timestamp is less than a threshold level, wherein the threshold level is no greater than 500 milliseconds;
in response to determining the time difference is less than the threshold level, modify a pacing algorithm used to originate the first voice telephone call over the interface thereby producing a modified pacing algorithm, wherein the modified pacing algorithm is used to originate a second voice telephone call over the interface; and
originate the second voice telephone call over the interface using the modified pacing algorithm.

9. The non-transitory computer readable medium of claim 8, wherein the instructions further cause the computer processor to:
modify the pacing algorithm so that the modified pacing algorithm originates the second voice telephone call at a slower rate relative to a rate associated with originating the first voice telephone call.

10. The non-transitory computer readable medium of claim 8, wherein the instructions further cause the computer processor to:
record in a log in a memory a third timestamp indicating when the pacing algorithm was modified along with information used to identify the telecommunications carrier.

11. The non-transitory computer readable medium of claim 8, wherein the instructions further cause the computer processor to:
generate an alert to an administrator after modifying the pacing algorithm, wherein the alert includes an indication of a pacing parameter value modified in the pacing algorithm and further includes information used to identify the telecommunications carrier.

12. The non-transitory computer readable medium of claim 8, wherein the instructions further cause the computer processor to:
generate an alert to an indicating an outage condition, and wherein the alert further includes information used to identify the telecommunications carrier.

13. The non-transitory computer readable medium of claim 8, wherein the error code comprises a "486 busy" error code received on the SIP-based VoIP interface of the telecommunications carrier.

14. The non-transitory computer readable medium of claim 8, wherein the instructions further cause the computer processor to:
after determining the time difference between the second timestamp and the first timestamp, determine that a timer has expired prior to modifying the pacing algorithm, wherein the timer covers a time period encompassing a plurality of call originations including the origination of the first telephone call to the telecommunications carrier.

15. The non-transitory computer readable medium of claim 8, wherein the instructions further cause the computer processor to:
increment a counter in response to originating the first voice telephone call;
reset the counter after modifying the pacing algorithm; and
increment the counter in response to originating the second voice telephone call.

16. A method for controlling the rate at which a dialer originates a telephone call comprising:
originating a first voice telephone call by the dialer over an interface comprising an integrated services digital network ("ISDN") interface or a SIP-based VoIP interface of a telecommunications carrier;
recording by the dialer a first timestamp of a call origination time associated with the first voice telephone call origination to the telecommunications carrier;
incrementing a call counter by the dialer in response to originating the first voice telephone call;
determining by the dialer a second timestamp associated with receipt of an error code over the interface from the telecommunications carrier reflecting that the first voice telephone call was not offered to the called party;
determining by the dialer that a time difference between the second timestamp and the first timestamp is less than a threshold level, wherein the threshold level is no greater than 500 milliseconds;
in response to determining the time difference is less than the threshold level, modifying a pacing algorithm by the dialer used to originate the first voice telephone call over the interface thereby producing a modified pacing algorithm, wherein the modified pacing algorithm is used to originate a second voice telephone call over the interface; and originating the second voice telephone call by the dialer over the interface using the modified pacing algorithm.

17. The method of claim 16, wherein the pacing algorithm is modified so that the modified pacing algorithm originates the second voice telephone call at a slower rate relative to a rate associated with originating the first voice telephone call.

18. The method of claim 16, further comprising:
recording by the dialer in a log stored a memory a third timestamp indicating when the pacing algorithm was modified along with information used to identify the telecommunications carrier.

19. The method of claim 16, further comprising:
generating an alert to an administrator after modifying the pacing algorithm, wherein the alert includes an indication of a pacing parameter value modified in the pacing algorithm and further includes information used to identify the telecommunications carrier.

20. The method of claim 19, wherein modifying the pacing algorithm by the dialer further comprises:
suspending call origination by the dialer prior to modifying the pacing algorithm; and
resuming call origination by the dialer after modifying the pacing algorithm.

\* \* \* \* \*